2,992,013
Patented July 11, 1961

2,992,013
UNITIZED SLIDING SPINDLE INDEPENDENT WHEEL SUSPENSION

Philip B. Zeigler and Robert L. White, Saginaw, and Raymond J. Schultz, Bay City, Mich., assignors to General Motors Corporation, Detroit, Mich., a corporation of Delaware
Filed Nov. 25, 1959, Ser. No. 855,388
4 Claims. (Cl. 280—96.2)

This invention relates to vehicle suspension and more particularly to sliding spindle type independent suspension for dirigible wheels.

An object of the invention is to provide an improved and simplified independent wheel suspension.

Another object is to provide a sliding spindle type independent wheel suspension in which the wheel deflection axis are dissimilar.

Still another object is to provide an arrangement of the stated character which is quickly and simply mountable and demountable from the vehicle.

A further object is to provide an arrangement of the type referred to which is so constructed and arranged that the bearing defining the steering axis surrounds the bearing defining the wheel deflection axis.

Still a further object is to provide an arrangement of the type described wherein the bearing defining the steering axis is fixed vertically with respect to the vehicle superstructure so that wheel deflection may occur without introducing corresponding vertical deflection of the steering mechanism of the vehicle.

Yet another object is to provide a sliding spindle dirigible wheel suspension of the type described which is simple in construction, low in cost, and efficient in operation.

Figure 1:
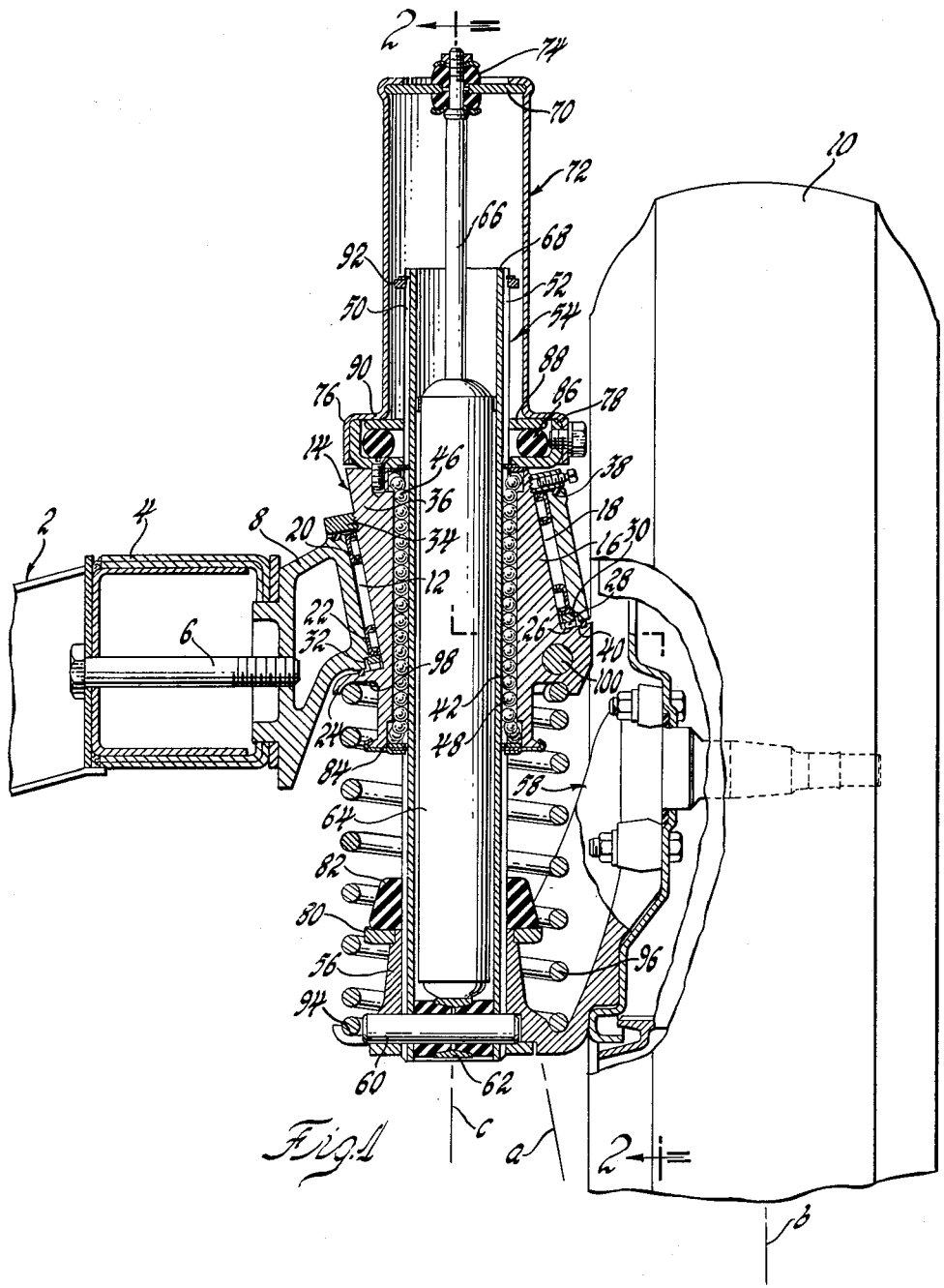
Figure 2:
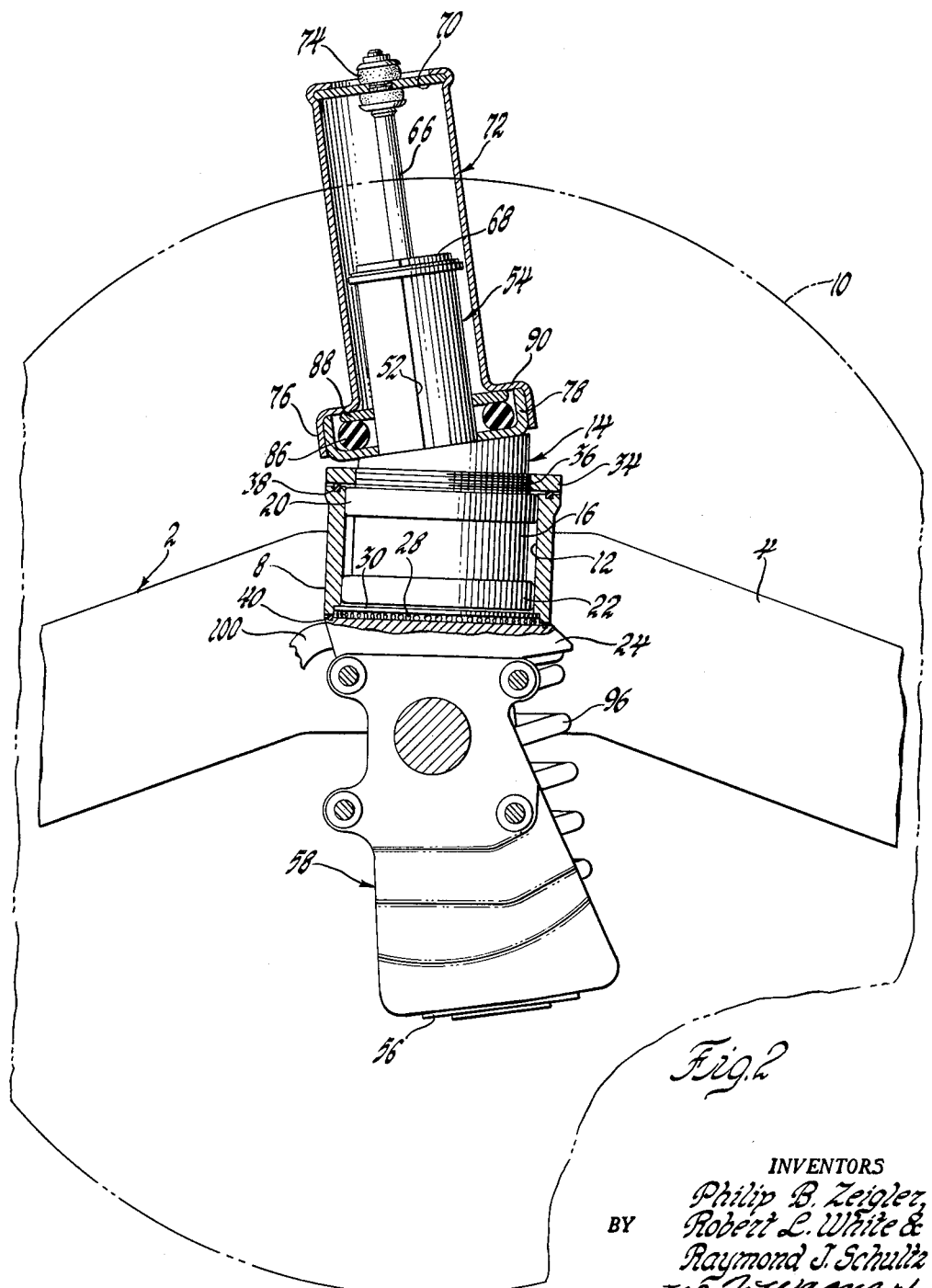

These and other objects, advantages, and features of the invention will become more fully apparent as reference is had to the accompanying specification and drawings wherein:

FIG. 1 is a front elevational view, partly in section and with parts broken away, illustrating a suspension in accordance with the invention; and FIG. 2 is a side elevational view, partly in section, of the suspension taken on line 2—2 of FIG. 1.

Referring now to the drawings and particularly FIG. 1, the reference numeral 2 designates generally a vehicle superstructure which may be regarded as either a frame or an integral body and frame construction. Superstructure 2 includes a box section side rail element 4, to which is attached by means of one or more bolts 6, a bracket 8 which forms a bearing housing defining the steering axis of a dirigible wheel 10. Bracket 8 is provided with a large diameter bore 12, which is inclined in front elevation to define a steering axis "a" which slopes downwardly and outwardly so as to intersect the ground near the intersection of the vertical wheel plane "b" with the ground. Bore 12 surrounds a steering spindle assembly 14 which includes a vertically intermediate portion 16 having an outer surface of revolution 18 which is coaxial with the bore 12 of bracket 8. Disposed between surface 18 and bore 12 are a pair of vertically spaced needle bearing assemblies 20 and 22. Immediately below intermediate portion 16, assembly 14 is formed with a flange portion 24 which forms an upper ledge 26 upon which is seated an axial thrust needle bearing assembly 28. The upper side or race 30 of assembly 28 is seated in a counterbore 32 formed at the base of bore 12. Assembly 14 is retained in the assembled position shown by turning a threaded lock ring 34 on the upper threaded portion 36 of assembly 14. Annular seals 38 and 40 function to prevent entrance of foreign matter into bore 12.

Extending vertically (as seen in front elevation) through assembly 14 is a generally cylindrical opening 42 which defines the deflection axis "c" for wheel 10. Opening 42 is formed with a plurality of circumferentially spaced vertically directed raceways containing recirculating ball bearing trains 46 and 48. Trains 46 and 48 in turn engage circumferentially spaced vertically directed grooves 50 and 52 formed in the outer wall of a tubular member 54 extending upwardly through opening 42. It will be understood that at least three slots similar to 50 and 52 and three sets of recirculating ball bearing trains are utilized, only two being shown for the sake of clarity in the drawings. Since the arrangement shown is well known in the art and commonly referred to as a recirculating ball spline, further description thereof is omitted. It will be understood, however, that the arrangement shown functions to provide minimum resistance to rectilinear motion of tubular member 54 while preventing rotation thereof relative to spindle assembly 14.

At its lower end, tubular member 54 is fitted in a vertically directed sleeve portion 56 formed as an integral part of wheel spindle assembly 58. Tubular member 54 is retained is sleeve portion 56 by means of a transverse pin element 60 which extends through aligned openings in both and coincidentally serves to anchor the ring connector 62 formed at the base of shock absorber assembly 64. Assembly 64 extends coaxially inside of tubular member 54 and includes a piston rod element 66 which normally extends upwardly beyond the upper end 68 of splined tube 54 for connection with the top wall 70 of a hat-shaped cover member 72 by means of an opposed buffer element connector 74. Cover member 72 in turn is formed with a lower enlarged pilot portion 76 which surrounds and is connected to a cup-shaped element 78 seated on and secured to the upper horizontal wall of spindle assembly 14.

In order to limit compression deflection of wheel 10 in accordance with the present invention, the upper extremity of sleeve portion 56 is provided with a ring seat 80 upon which is seated an annular flexible element 82 adapted to engage the lower horizontal extremity 84 of assembly 14. Conversely, rebound deflection is arrested by an annular resilient member or O-ring 86 which is caged between a ring member 88 seated on the radially directed portion 90 of pilot portion 76 and the upwardly facing surface of cup member 78. To render the rebound stop construction effective, the upper extremity of splined tube 54 has an annular ring 92 keyed thereto which engages ring 88 upon occurrence of rebound deflection of sufficient magnitude.

In order to provide resilient support of the vehicle superstructure 2 with respect to wheel 10, sleeve portion 56 of spindle 58 is provided with a lower annular spring seat 94 in which is received the lower extremity of a coil spring 96. The upper extremity of coil spring 96 in turn is seated in an upper annular spring seat 98 formed on steering spindle assembly 14.

In order to steer wheel 10 about the axis defined by bore 12, steering spindle assembly 14 is connected to a steering arm 100, which may extend either forwardly or rearwardly for connection with suitable steering linkage, not shown. In this connection, it is important to note that steering linkage geometry may be designed without regard to wheel deflection, owing to the fact that the steering arm 100 moves in a plane which is constant with respect to the vehicle superstructure. Hence, the geometry of the steering linkage does not require compensation for vertical deflection of the steering arm as would be the case if the steering arm were mounted directly on wheel spindle assembly 58.

In accordance with another feature of the invention, as seen best in FIG. 2, the entire assembly is mounted on the vehicle superstructure so that the wheel deflection axis defined by tubular member 54 is inclined forwardly and upwardly as seen in side elevation. In this manner, any desired degree of resistance to nose diving during vehicle braking is achieved, it being understood that dive resistance will progressively increase to 100% as the angle defined by the tube 54 approaches perpendicularity with a line extending between the wheel contact spot on the ground and the vehicle center of gravity.

From the foregoing it will be seen that a novel improved wheel suspension has been devised. It is particularly to be noted that an arrangement according to the present invention is extremely versatile in application, owing to the fact that the steering axis and wheel deflection axis are independent and, therefore, no compromise is required. Even more important is the fact that the various elements of the construction are combined and arranged to afford optimum compactness, minimum protrusion of the suspension elements into space above the vehicle wheel, as well as affording greatly expanded lateral space between the respective wheel assemblies. Furthermore, by disposing the steering axis bearing assembly so that it surrounds the sliding spindle substantially vertically midway, moments induced by various loads on suspension are reduced to a minimum. It will also be noted that the steering movement occurs about the relatively large diameter surface of revolution 18 on the spindle assembly 14, thus tending to increase service life and ruggedness.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In a motor vehicle, a unitary sliding spindle dirigible wheel suspension comprising, a bracket detachably secured to the vehicle sprung mass, said bracket having a generally vertically directed aperture formed therein defining a steering axis which slopes downwardly and outwardly relative to the wheel plane, radial load bearing means carried in said aperture, a steering spindle assembly rotatably disposed in said aperture having an outer surface of revolution engaging said radial bearing means, said spindle assembly having an aperture extending therethrough defining a wheel deflection axis which is parallel with the wheel plane, an elongated tubular element reciprocable in said last-mentioned aperture, recirculating ball spline means between said assembly and said tubular element, a wheel spindle support, said support having an integral sleeve portion secured to the lower end of said tubular element, a coil spring disposed around said element and compressed between said spindle support and said steering spindle assembly, a hat-shaped dome secured to the upper end of said steering spindle assembly in axial alignment with said tubular element, a hydraulic shock absorber disposed within said tubular member having its opposite ends connected respectively to said wheel spindle support sleeve and said hat-shaped dome, and vertically spaced elastic buffers mounted on said sleeve and steering spindle respectively acting to limit compression and rebound deflection respectively.

2. The structure set forth in claim 1 wherein said wheel spindle support sleeve is secured to said tubular member by a transverse pin, the midportion of which forms an anchor for the lower end of the shock absorber.

3. The structure set forth in claim 1 wherein the elastic buffer on said steering spindle is partially caged by a floating ring surrounding said tubular member, and the upper end of said tubular member includes a fixed ring engageable with said floating ring upon predetermined rebound deflection to deform said buffer.

4. The structure set forth in claim 1 wherein said steering axis and said wheel deflection axis are inclined forwardly and upwardly in side elevation.

References Cited in the file of this patent

UNITED STATES PATENTS

| 2,032,975 | Broulhiet | Mar. 3, 1936 |
| 2,070,289 | Marmon et al. | Feb. 9, 1937 |
| 2,124,087 | Smith | July 19, 1938 |
| 2,567,144 | Butterfield | Sept. 4 1951 |

FOREIGN PATENTS

| 1,067,478 | France | Jan. 27, 1954 |

UNITED STATES PATENT OFFICE
CERTIFICATE OF CORRECTION

Patent No. 2,992,013                            July 11, 1961

Philip B. Zeigler et al.

It is hereby certified that error appears in the above numbered patent requiring correction and that the said Letters Patent should read as corrected below.

Column 1, line 18, after "axis" insert -- and steering axis --; column 2, line 22, for "retained is" read -- retained in --.

Signed and sealed this 21st day of November 1961.

(SEAL)
Attest:

ERNEST W. SWIDER
Attesting Officer

DAVID L. LADD
Commissioner of Patents

USCOMM-DC